(12) United States Patent
Larsen

(10) Patent No.: US 8,922,644 B2
(45) Date of Patent: Dec. 30, 2014

(54) TRACKING HEAD POSITION AND ORIENTATION

(75) Inventor: Eric J. Larsen, Pacifica, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 181 days.

(21) Appl. No.: 12/900,403

(22) Filed: Oct. 7, 2010

(65) Prior Publication Data

US 2012/0086801 A1 Apr. 12, 2012

Related U.S. Application Data

(63) Continuation-in-part of application No. PCT/US2010/051836, filed on Oct. 7, 2010.

(51) Int. Cl.
| | |
|---|---|
| H04N 7/18 | (2006.01) |
| G02B 27/00 | (2006.01) |
| G01B 11/02 | (2006.01) |
| H04N 13/04 | (2006.01) |

(52) U.S. Cl.
CPC ...... *G02B 27/0093* (2013.01); *H04N 2213/008* (2013.01); *G01B 11/026* (2013.01); *H04N 13/0468* (2013.01)
USPC ...................................................... 348/135

(58) Field of Classification Search
None
See application file for complete search history.

(56) References Cited

U.S. PATENT DOCUMENTS

| | | | |
|---|---|---|---|
| 5,192,960 A | 3/1993 | Komamura | |
| 5,870,636 A | 2/1999 | Sugita et al. | |
| 6,057,811 A | 5/2000 | Edwards | |
| 6,200,713 B1 * | 3/2001 | Agostinelli et al. | 430/22 |
| 6,857,739 B1 | 2/2005 | Watson | |
| 7,295,947 B2 * | 11/2007 | Kurth et al. | 702/151 |
| 2002/0101988 A1 | 8/2002 | Jones | |
| 2003/0095186 A1 * | 5/2003 | Aman et al. | 348/162 |
| 2004/0183926 A1 * | 9/2004 | Fukuda et al. | 348/239 |
| 2004/0201823 A1 | 10/2004 | Raskar et al. | |
| 2005/0128551 A1 * | 6/2005 | Yang | 359/214 |
| 2005/0134981 A1 * | 6/2005 | Poulsen | 359/850 |
| 2006/0012974 A1 | 1/2006 | Su | |

(Continued)

FOREIGN PATENT DOCUMENTS

| | | |
|---|---|---|
| EP | 1 402 929 A1 | 3/2004 |
| GB | 2 400 569 A | 10/2004 |
| WO | WO 99/23524 A1 | 5/1999 |
| WO | WO 2008/056180 A2 | 5/2008 |

OTHER PUBLICATIONS

International Search Report and Written Opinion, PCT Application No. PCT/US11/42454, dated Oct. 28, 2011, 8 pages.

(Continued)

*Primary Examiner* — Andy Rao
*Assistant Examiner* — James Anderson, II
(74) *Attorney, Agent, or Firm* — Kilpatrick Townsend & Stockton LLP

(57) ABSTRACT

Methods, devices, and systems are presented for determining a distance to an object using a color camera and special markers mounted on the object that refract or reflect different colors depending on the angle at which they are viewed. Different colors can be refracted or reflected using lenticular lenses or other technologies. The color received by the camera reveals the orientation of the markers. The orientation information can be combined with the perceived angular distance between the markers and the known distance between the markers to determine the actual distance to the object.

16 Claims, 15 Drawing Sheets

(56) References Cited

U.S. PATENT DOCUMENTS

2007/0081695 A1* 4/2007 Foxlin et al. .................. 382/103
2007/0263923 A1   11/2007 Gienko et al.
2008/0024435 A1   1/2008 Dohta
2010/0123821 A1* 5/2010 Gwak et al. .................. 348/371
2010/0177174 A1   7/2010 Ko et al.

OTHER PUBLICATIONS

EP Patent Application No. 11 83 1083. Supplementary Search Report, Jun. 20, 2014, 6 pages.

\* cited by examiner

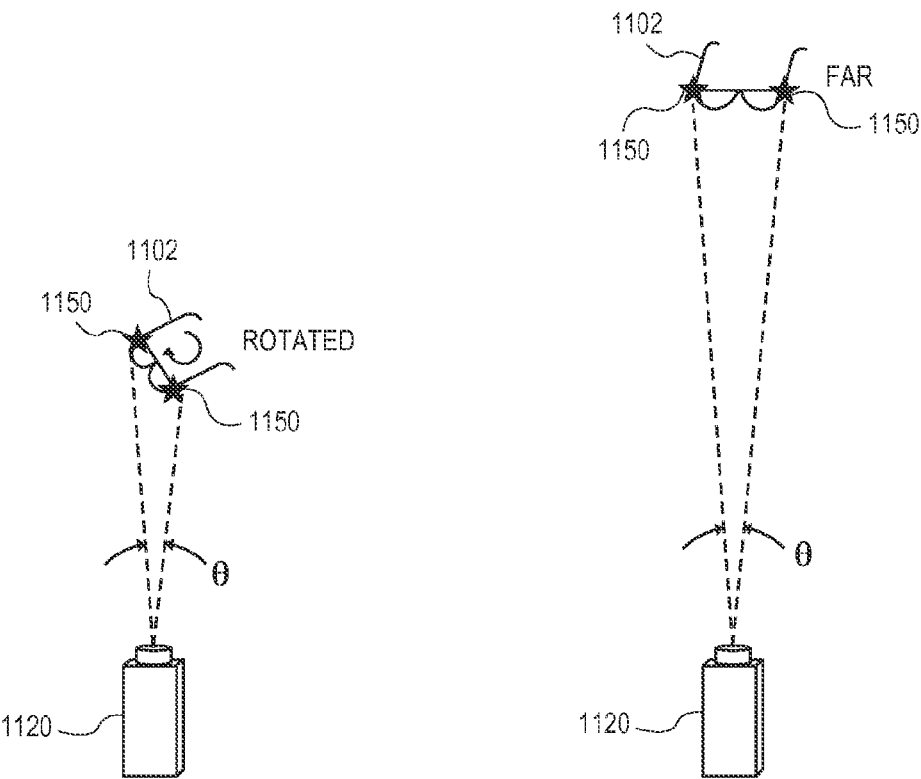
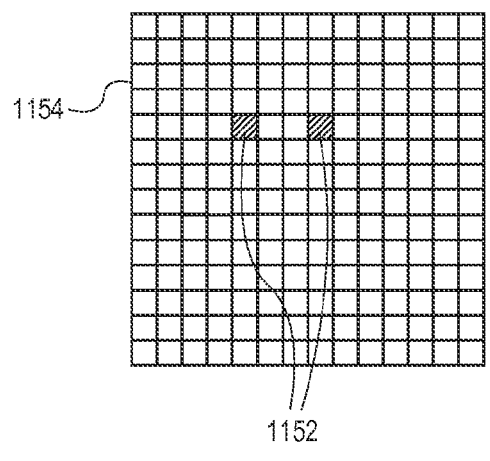
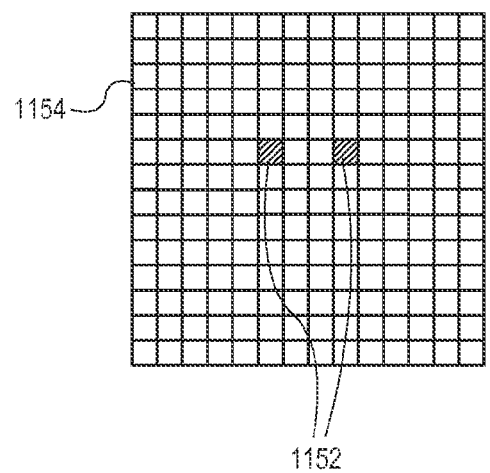
FIG. 1A      FIG. 1B

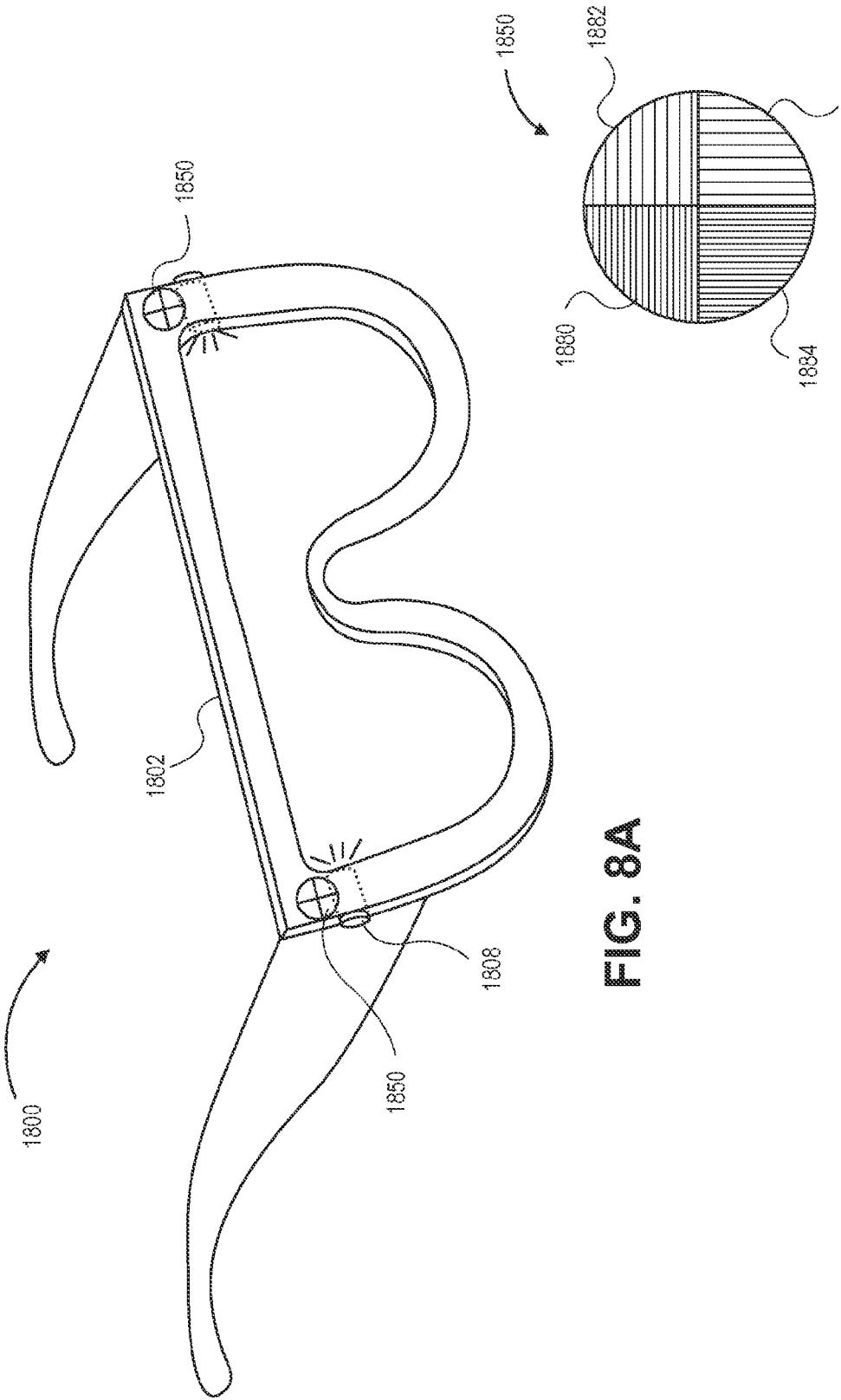

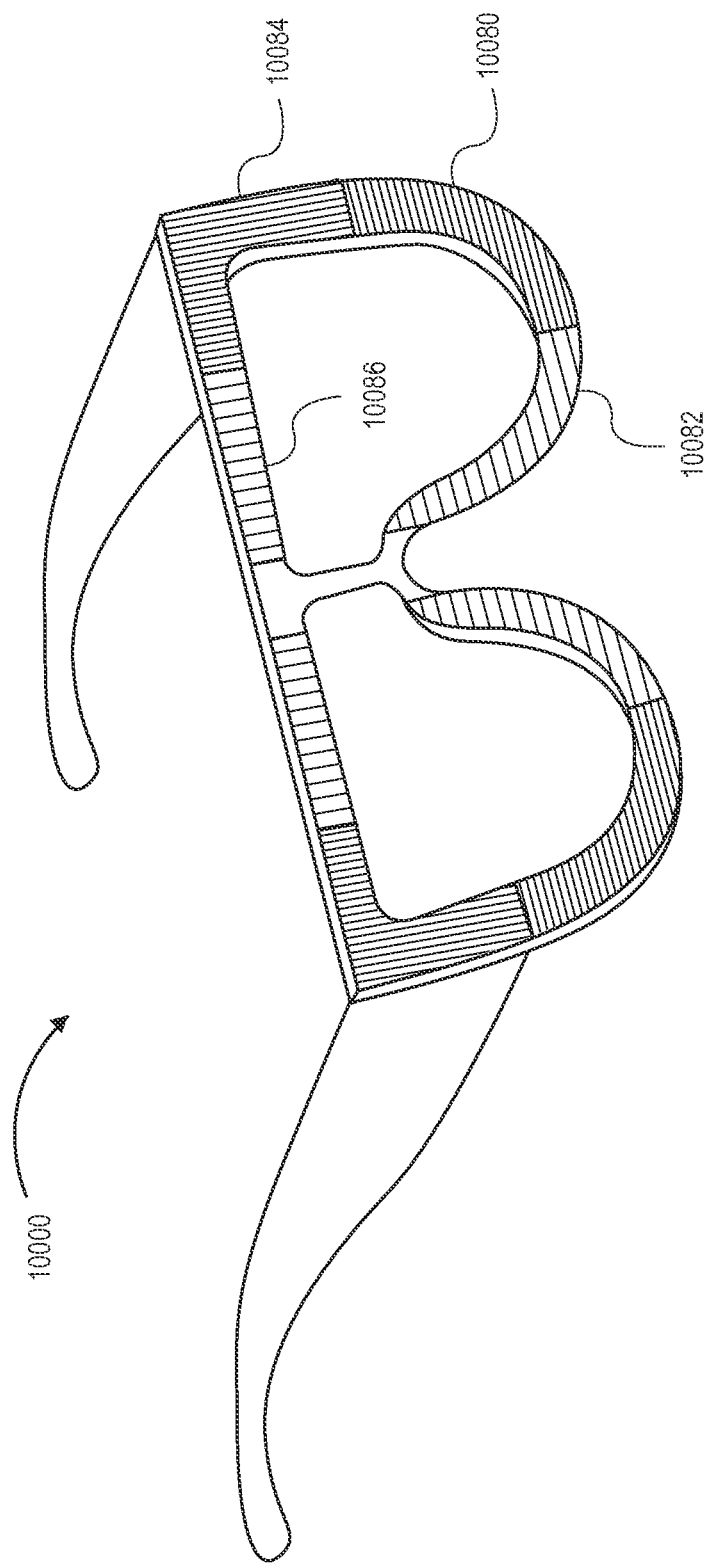

TRACKING HEAD POSITION AND ORIENTATION

CROSS-REFERENCES TO RELATED APPLICATIONS

This application is a continuation-in-part of a Patent Cooperation Treaty (PCT) Application No. PCT/US2010/51836 titled "3-D Glasses With Illuminated Light Guide", filed Oct. 7, 2010, which is incorporated by reference in its entirety for all purposes. This application is related to a PCT Application No. PCT/US2010/51827 titled "3-D Glasses With Camera Based Head Tracking", filed Oct. 7, 2010, which is incorporated by reference in its entirety for all purposes.

BACKGROUND

1. Field of the Invention

Embodiments of the present invention relate to camera-based tracking of objects, such as a user's head, in which markers are tracked by the camera, the markers changing color depending on their orientation to the camera. The orientation of the markers, determined from their color, is used along with the angular distance between them in order to resolve the distance of the object from the camera. In particular, some embodiments relate to markers mounted on a user's glasses head being tracked by a video-game console's camera in order to provide realistic 3-D effects and other feedback to the video game.

2. Description of the Related Art

Video games have become more immersive as technology progresses. Video game consoles are often produced with state-of-the-art processors, extremely fast memory, and high-end graphics cards. Input controllers have evolved from simple knobs, joysticks, and button-based controllers to accelerometer-enabled controllers that a user can swing in his or hands or wear. Further input technologies involve a camera, usually mounted on top of a television, tracking a user's body, including tracking his or her head, torso, arms, and legs. Users can control such video games by simply moving their bodies or parts thereof. For example, a player of a skateboarding game can duck down so that he or she clears a virtual bridge.

Three-dimensional (3-D, or 3D) televisions help immerse users in events happening on their display screens. For such 3-D televisions, a user sometimes dons 3-D glasses. Earlier 3-D glasses included red and blue lenses for discerning an anaglyph. Shuttered 3-D glasses have lenses that rapidly and alternatingly switch between being opaque and transparent in synchronization with a display that rapidly shows left and right images. Other types of 3-D presentation technology exist. Many are similar in that they present a separate two-dimensional image to a viewer's left eye and a separate two-dimensional image to the viewer's right eye either contemporaneously or very rapidly (e.g., at 60 Hz) in order to trick the viewer's brain into interpreting the stereoscopic images as a 3-D environment.

Video games utilizing 3-D display technologies can immerse a player in a game through the use of 3-D effects on the screen. Furthermore, video game consoles with body tracking can use 3-D effects to coordinate a player's actual movements in the real world with his or her virtual movement in a displayed virtual world. Head tracking can be critical for games that render based on where a user's head is. For example, as a user steps toward the television in his living room, a video game console can render a 3-D virtual pyre on the television so that it appears like he moves closer to it.

Thus, tracking the location, orientation, and movement of a viewer or other user's head or body parts can be important for some video games, especially those that use head-tracking to render 3-D objects closer to the user. There exists a need in the art for more robust head tracking that is not too expensive for mass production.

BRIEF SUMMARY

Devices, systems, and methods of the present disclosure are related to camera-based tracking of a user wearing markers for detecting motion, such as markers mounted on a pair of glasses. The markers refract or reflect different colors at different angles (e.g., red at 10° and yellow at 30°). From the apparent color of the markers, their orientation can be determined. Using the orientation and angular distance between the markers, a distance to the markers can be calculated.

Devices that refract or reflect different colors at different angles include lenticular lenses, angular metamerism plastic, and/or mini prisms. They can be aligned to give a predetermined color (e.g., red) in one predetermined orientation (e.g., facing the camera, 0 degrees of yaw) and another predetermined color (e.g., violet) in another predetermined orientation (e.g., looking to the left at 90 degrees). A color camera can then be used to not only track a position of the glasses but also determine the wearer's head angle by identifying the color refracted and reflected by the lenticular lens. In some embodiments, the change in colors observed by a camera can be used to determine the rate of change of the angle (or higher derivatives) of the wearer's head without determining the absolute angle of the wearer's head.

Technical advantages of the methods, devices, and systems herein include robust head tracking in which distances from a camera can be accurately determined through inexpensive add-ons to existing equipment. Glasses with plastic lenticular lenses can be inexpensively mass produced. Variable backlighting on board the glasses offers less distraction to the user in low light situations and reduces power requirements. Existing set-top body tracking cameras can be used if they can detect color. Black & white cameras can be inexpensively upgraded to color cameras. It may be less expensive to upgrade to a color camera than to upgrade to a camera with more resolution for tracking. Lenticular lenses and/or prisms can also refract and reflect near-infrared light, which can often be picked up by charge-coupled device (CCD) cameras.

An embodiment of the present disclosure relates to a marker device for enabling the tracking of an object, including a first marker, the marker having a first means for refracting or reflecting a first predetermined color at a first predetermined angle and a second predetermined color at a second angle, the colors corresponding to the respective angles, a second marker, means for supporting the markers at a fixed distance from one another, and means for coupling the markers to a user. The distance to the user can be determined from an angular distance between the markers and observed colors of the markers.

An embodiment relates to a system for tracking a user's head, including a first marker, the marker having a first means for refracting or reflecting different predetermined colors over different angles, each color corresponding to a predetermined angle, a second marker, the second marker located at a fixed distance from the first marker, and means for coupling the markers to a user. The system further includes a color camera and a circuit configured to use the color camera to resolve an angular distance between the markers and determine a distance to the markers using the angular distance and apparent colors of the markers.

An embodiment relates to a method for determining a distance to an object, including receiving a color image of markers from a camera, the markers supported at a fixed distance from one another, resolving an angular distance between the markers, determining an orientation of the markers using an apparent color of at least one of the markers, and determining a distance from the camera to the markers using the angular distance and the determined orientation of the markers.

BRIEF DESCRIPTION OF THE DRAWINGS

A further understanding of the nature and advantages of the present invention may be realized by reference to the following drawings. In the figures, similar components or features may have the same reference label.

FIG. 1A illustrates angular distance in accordance with an embodiment.

FIG. 1B illustrates angular distance in accordance with an embodiment.

FIG. 8A illustrates glasses in accordance with an embodiment.

FIG. 8B illustrates a marker of the glasses of FIG. 8A.

FIG. 10 illustrates frame-shaped markers in accordance with an embodiment.

Figure 2:
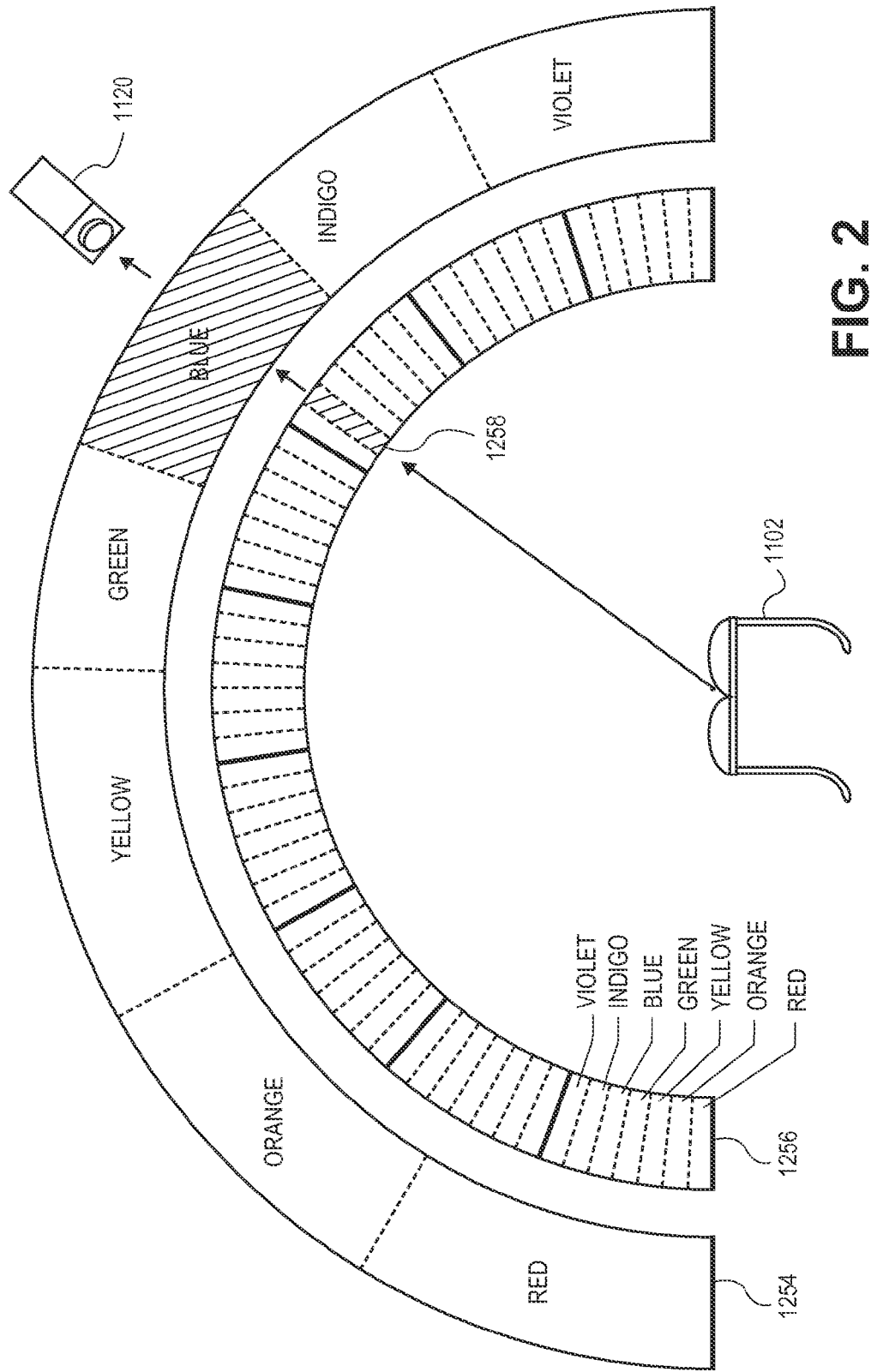
FIG. 2 illustrates different colors being refracted or reflected over different angles in accordance with an embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

The present disclosure is related to tracking of objects, such as a user's head, using a camera and markers that show different colors depending on the angle at which they are viewed. The markers can be made of lenticular lenses with different colors in their backplane. A camera perceives the color refracted or reflected from the markers and uses this color information to determine the angle at which the glasses are turned with respect to the camera. Once the orientation of the glasses is determined from the color, a nonambiguous distance to the glasses from the camera can be calculated from the angular distance between the markers.

Other embodiments described herein relate to tracking a user's head using a camera and illuminated glasses. The glasses can be 3-D glasses that are synchronized in time with a television. The glasses employ a light guide, such as LGP, that conveys and disperses light from LEDs through the frame. The glasses can also have retroreflectors that not only reflect ambient light to the tracking camera, but also have a reflective backing that reflects light back into the LGP over which it is affixed. The LEDs can be dimmed or brightened depending on the ambient light. A sensor for the ambient light can be on-board or off-board the glasses. The camera itself can be used as the off-board sensor.

Refracting or reflecting different predetermined colors at different angles can be accomplished through lenticular lenses, mini prisms, etc. Mini prisms can be affixed to the glasses in order to refract and reflect a predetermined color in one predetermined orientation while refracting and reflecting a different predetermined color at another predetermined orientation. Lenticular printing or plastic with angular metamerism can be used instead of or in addition to mini prisms. In another embodiment, the rate of motion of the user's head can be determined by the amount of change of color over time.

FIGS. 1A and 1B illustrate angular distance, and ambiguity associated therewith. In both figures, camera 1120 tracks markers 1150 of glasses 1102. In FIG. 1A, the glasses are close to the camera, and in FIG. 1B, they are far from the camera. However, because the glasses in FIG. 1A are rotated with respect to the camera, the markers on their outer edges appear to be at the same angular distance θ.

Pixel representations 1154 show where the markers are from the perspective of the camera. Marker representations 1152 in both figures are the same number of pixels apart. The camera cannot tell how far away the glasses are if it only measure the angular distance between the markers because the rotation of the glasses is unknown. If the orientation of the glasses is known, then the ambiguity can be resolved.

FIG. 2 illustrates different colors being refracted or reflected over different angles from a pair of glasses. Glasses 1102 have two markers that change color depending on the angle from which they are viewed. One of the markers corresponds to color index 1254, and the other marker corresponds to color index 1256. At small angles, from about 0° to about 25°, marker 1254 appears red, while at greater angles, about 25° to 50°, the marker 1254 appears orange. Still greater angles produce different colors as shown. This first marker can be used to determine roughly at what angle the glasses are angled.

The second marker has finer color gradations than the first marker. Second marker 1256's colors repeat themselves nine times over 180°, as shown in the figure. Such repetition of colors, backgrounds, etc. can be achieved using lenticular lenses. Over the course of merely 20°, there are seven colors. These finer gradations can be used to further refine the angle at which the glasses are viewed.

For camera 1120 viewing the glasses as shown in the figure, the camera perceives or observes the marker 1254 as being blue and marker 1256 as being orange. From the apparently 'blue' and 'orange' marker colors, camera 1120, and/or its associated electronics, can determine the glasses' orientation. Specifically, the camera determines from the blue and orange markers that the glasses are yawed at angle 1258 with respect to the camera, about 123° off of the glasses' boresight.

Although spectral (rainbow) colors are shown in the diagram, any combination of colors or images can be used. For example, a lenticular lens may show only three colors: red, green, and blue. Such colors may be best picked up by CCD or other digital cameras.

Figure 3:
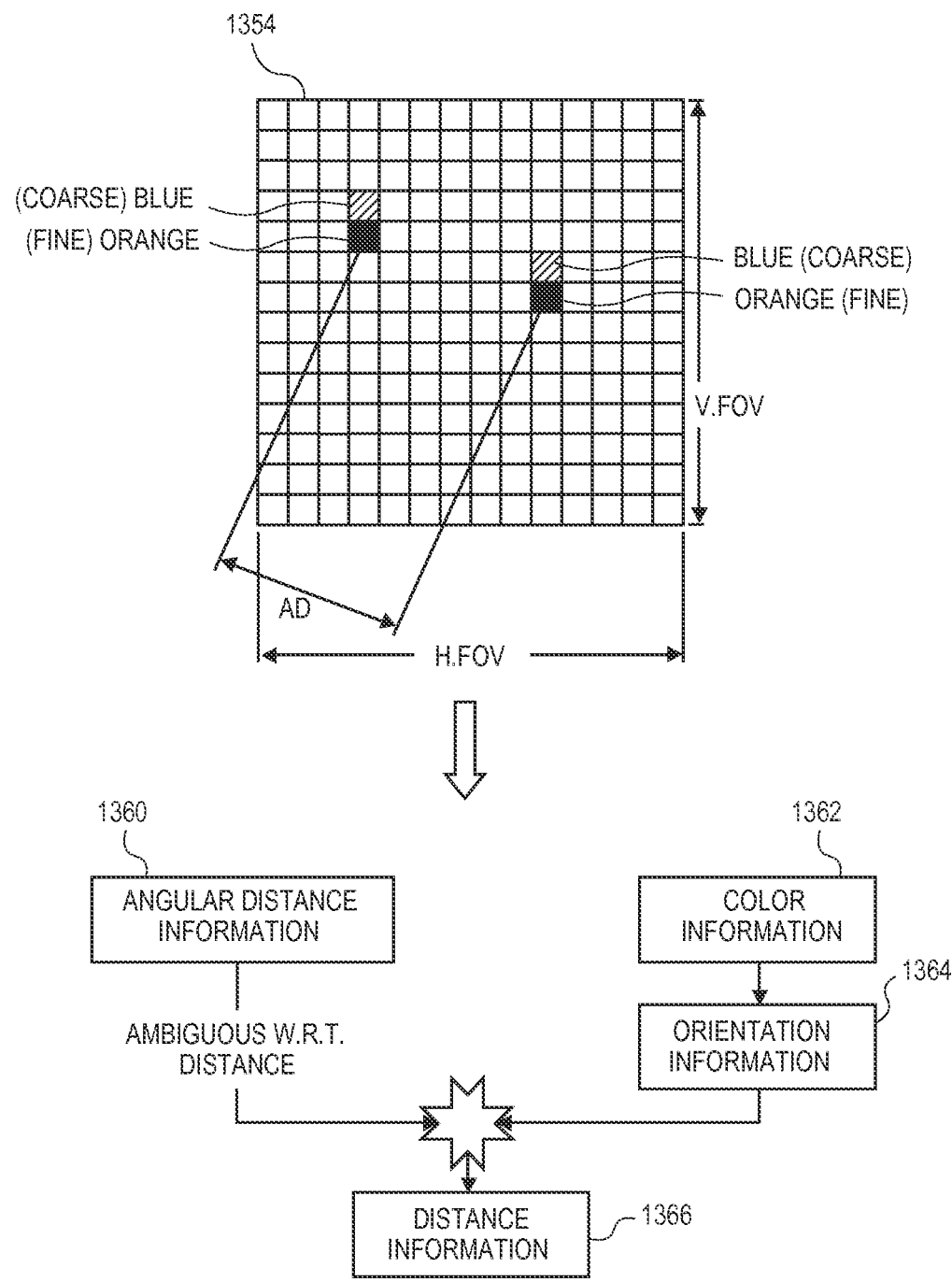
FIG. 3 illustrates distance determination using angular distance and color information in accordance with an embodiment.

FIG. 3 illustrates distance determination using the angular distance, such as that from FIGS. 1A-1B, and color information, such as that from FIG. 2.

Pixel representation 1354 shows a camera's view of markers on glasses. Angular distance AD can be determined from the distance between the pixels and the known horizontal and vertical fields of view (FOV). One can convert from pixels to engineering units in the physical world by simple scaling factors and geometry as is known in the art.

Angular distance information 1360, which is ambiguous with respect to distance, can be combined with orientation information 1364, which is derived from color information 1364, to produce distance information 1366.

Figure 4:
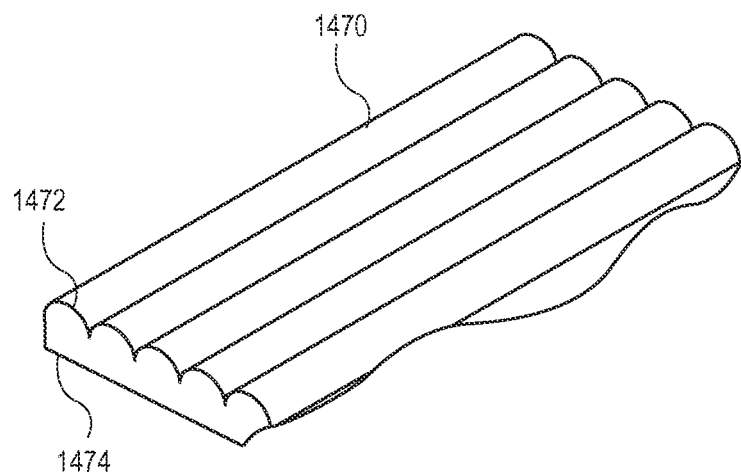
FIG. 4 illustrates cylindrical lenticular lenses in accordance with an embodiment.
Figure 5:
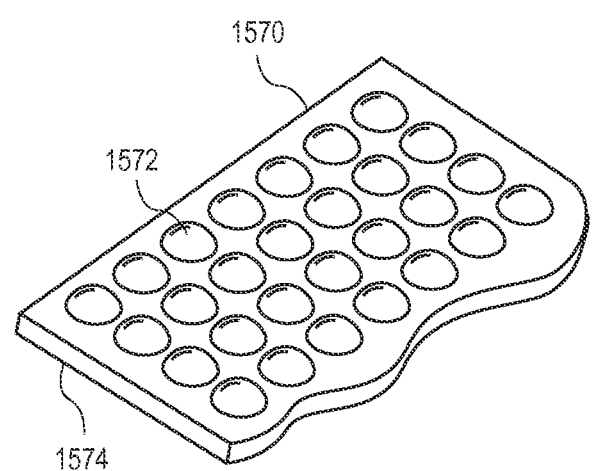
FIG. 5 illustrates hemispherical lenticular lenses in accordance with an embodiment.

FIGS. 4 and 5 illustrate lenticular lenses. FIG. 4 illustrates cylindrical lenticular lenses, and FIG. 5 illustrates hemispherical lenticular lenses. Cylindrical lenticular lens includes ridges 1472 and backplane 1474. A color image can be printed on backplane 1474. Hemispherical lenticular lens 1570 includes bumps 1572 and backplane 1574. A color image can be printed on backplane 1574.

Figure 6:
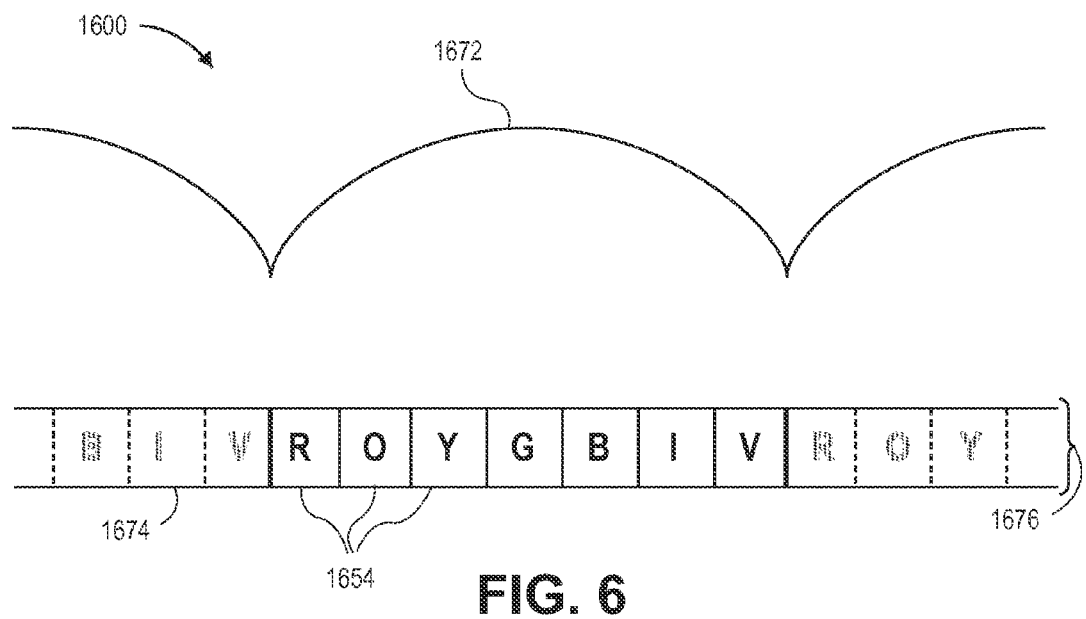
FIG. 6 illustrates a coarse portion of a marker in accordance with an embodiment.

FIG. 6 illustrates a coarse portion of a marker in accordance with an embodiment. In coarse portion 1600, ridges 1672 overlay backplane 1674 upon which image 1676 is printed. Image 1676 includes stripes of colors 1654. Because of the extended geometry of ridge 1672, the coarse portion shows a gradual gradient of colors with respect to angle.

Figure 7:
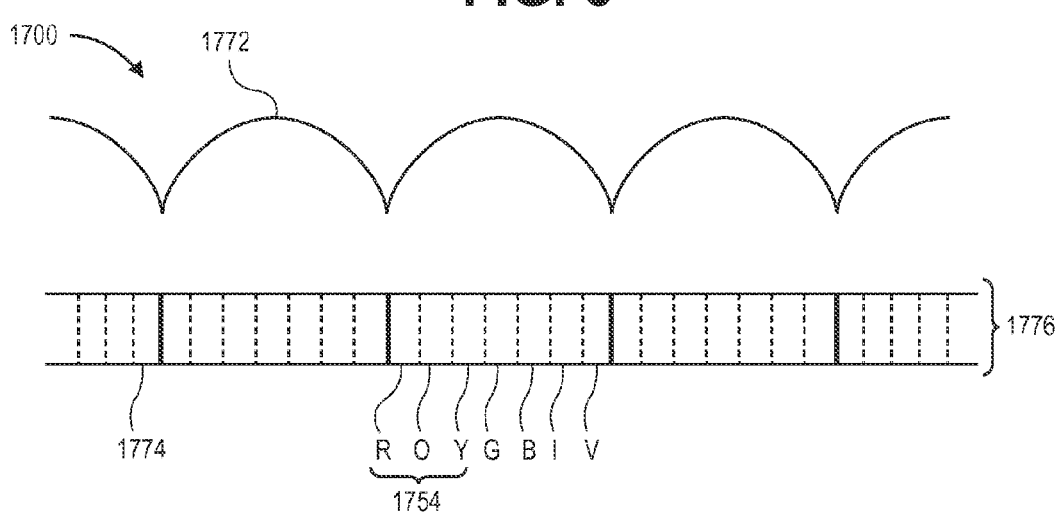
FIG. 7 illustrates a fine portion of a marker in accordance with an embodiment.

FIG. 7 illustrates a fine portion of a marker in accordance with an embodiment. In fine portion 1700, ridges 1772 overlay backplane 1774 upon which image 1776 is printed. Image 1776 includes stripes of color 1754. Because of the relatively narrow geometry of ridge 1772, the fine portion typically shows more repeated patterns of colors with respect to angle than coarse portion 1600.

FIGS. 8A-8B illustrate glasses and a marker in accordance with an embodiment. Glasses 1800 include markers 1850 on opposite sides of frames 1802. The glasses can be standard glasses, specialty glasses, 3-D glasses, etc.

Circular markers 1850 include four sections, one section in each quadrant of each marker with horizontal and vertical sections oriented perpendicularly to one another. Horizontal fine section 1880 and horizontal coarse section 1882 cover the top two quadrants of each marker. Vertical fine section 1884 and vertical coarse section 1886 cover the bottom quadrants of each marker. Any section can have any quadrant (e.g., fine or coarse, horizontal or vertical), and different layouts for the markers are envisioned. Incorporating both horizontally and vertically aligned/polarized sections on each marker can be helpful for relating orientations in two axes, such as pitch and yaw.

Backlights 1808 can be used to shine through or otherwise illuminate the markers from behind through transparent/translucent material of the markers. For example, a backlight can shine through backplane 1674 (FIG. 6) of lenticular lenses. The backlights can be turned up or down depending on ambient light levels so that they are clearly visible in different lighting conditions.

Figure 9A:
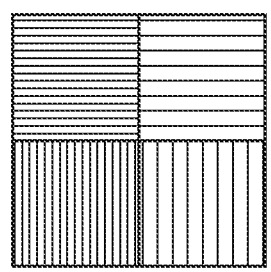
FIG. 9A illustrates a rectangular marker in accordance with an embodiment.
Figure 9B:
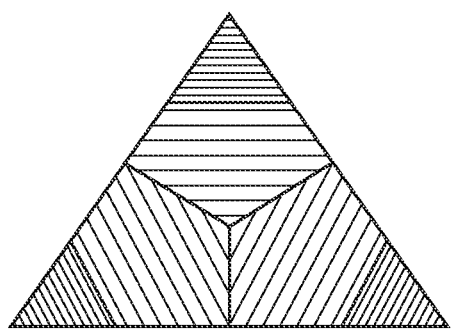
FIG. 9B illustrates a triangular marker in accordance with an embodiment.
Figure 9C:
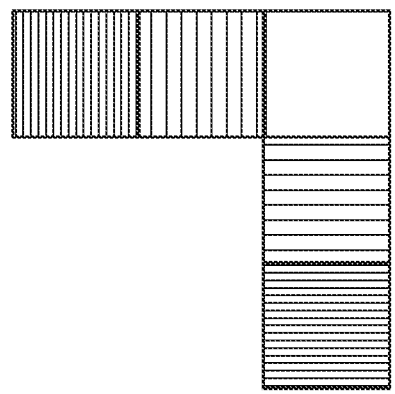
FIG. 9C illustrates an 'L'-shaped marker in accordance with an embodiment.

FIGS. 9A-9C illustrate some alternate shapes of markers in accordance with embodiments. FIG. 9A illustrates a rectangular/square marker divided into four quadrants. FIG. 9B illustrates a triangular marker divided into six sections. In the triangular marker shown, the section alignments are not orthogonal to one another and therefore may be used to increase redundancy in the system. FIG. 9C illustrates an 'L'-shaped marker. A blank, reflective area in the upper right of the exemplary marker can be used for calibration. For example, in a low lit room, the other colors may not appear to the camera as their predetermined colors. A camera could determine the light levels from the blank, reflective area and then calibrate itself for viewing the other colors refracted or reflected from the coarse and fine portions of the markers.

FIG. 10 illustrates frame-shaped markers that fill up the entire frames of a pair of glasses. Glasses 10000 include horizontal coarse section 10082, horizontal fine section 10080, vertical coarse section 10086, and vertical fine section 10084. Because a maximum portion of frame area is occupied by color-changing material, the colors can be better seen by a camera.

Although multiple markers are shown in the exemplary embodiment, only one color-changing marker may be necessary for some embodiments. One marker's color can indicate the orientation of the markers to an observing camera. For example, the width of one marker may be used instead of two, distinct markers to determine the angular distance. That is, the two extents of one marker can be seen as 'two' markers in order to judge the distance to the markers.

In some embodiments, the color of a marker only changes along an angle aligned with another marker. That is, when rotating around a marker, the color only changes when rotating away from or toward the other marker. Because the rotation of the markers with respect to each other in and out of the viewing plane is the direct cause of the ambiguity in determining distance from an observed angular distance (see FIG. 1), color information indicating that rotation angle is generally all that is needed to resolve the ambiguity.

Figure 11A:
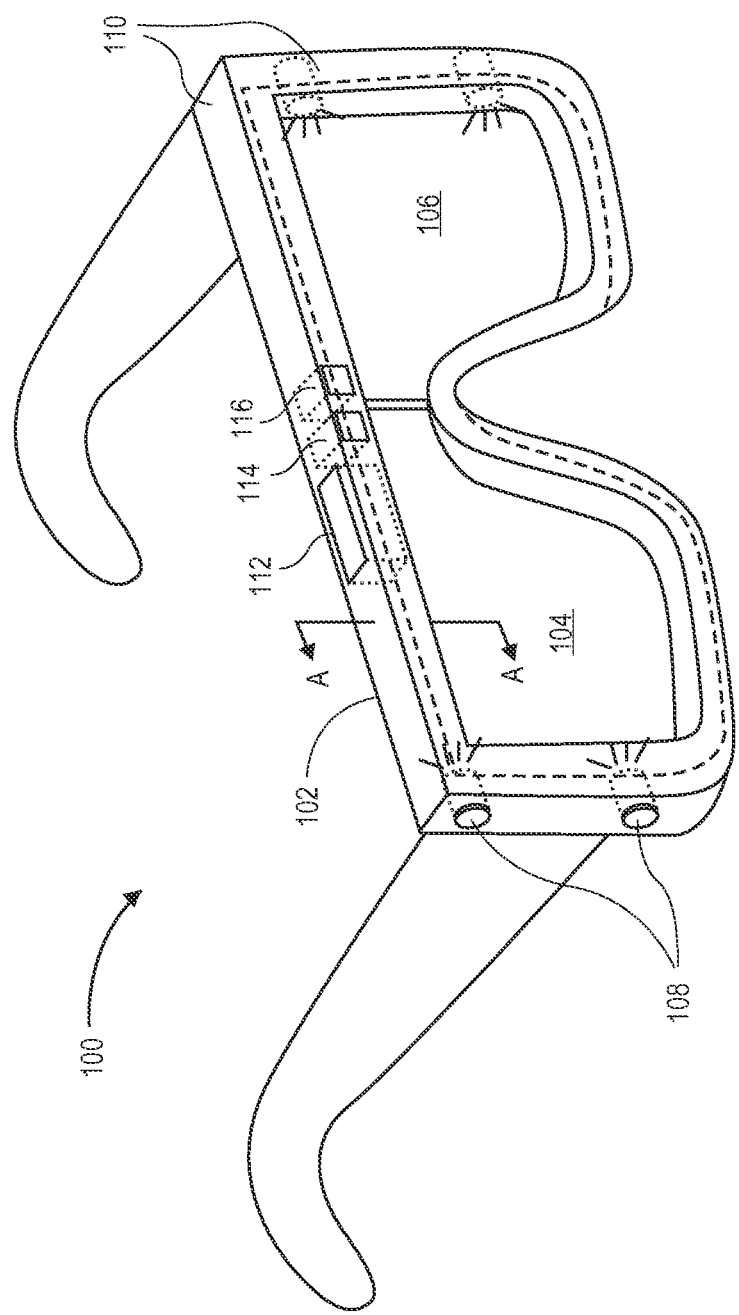
FIG. 11A illustrates 3-D glasses in accordance with an embodiment.

FIG. 11A illustrates 3-D glasses in accordance with an embodiment. Although non-3-D glasses can certainly be used, this description will hereon refer to 3-D glasses. 3-D glasses 100 include frame 102, right lens 104, and left lens 106. Right and left lenses 104/106 can shutter between transparent and opaque states in sync with a 3-D display, such as a 3-D television. Frame 102 includes a light guide, here light guide plate (LGP) 110, that consists of transparent-to-translucent material (or hollowed material), such as polymethyl methacrylate (PMMA), that conveys light from four embedded LEDs 108 that shine into the LGP.

LEDs 108 can be controlled through circuit 112, which in turn is connected to ambient light sensor 114. If ambient light sensor 114 senses very bright light, then circuit 112 brightens LEDs 114 so that LGP 110 can be better made out by a camera that tracks the glasses. If ambient light sensor 114 senses very low light levels, then circuit 112 dims LEDs so that the glow of LGP 110 does not distract the wearer.

The lenses can be synchronized with the LED duty cycles. For example, when lens 104 is opaque, LEDs 108 on the right side of the glasses can be turned on, and when lens 104 is transparent, LEDs 108 on the right side of the glasses can be turned off. The on/off duty cycle of the LEDs not only saves battery power but can lessen distractions to the user.

Wireless receiver 116 synchronizes the 3-D glasses to a 3-D television. Receiver 116 also can receive an indicator to turn up or down the brightness of the LEDs in the glasses. In this way, an off-board ambient light sensor, such as a tracking camera, can determine whether there is enough ambient light and send an indicator, through a wireless connection, to the glasses signaling to increase or decrease the LED brightnesses. In some embodiments, an off-board source may determine that certain lights need to be turned on brighter, and the corresponding lights may be individually brightened.

LEDs 108 can be manufactured to emit near-infrared wavelengths that are visible to many charge-coupled device (CCD) cameras. Electromagnetic radiation from near-infrared LEDs is not visible to humans and may be less likely to distract a wearer.

LEDs 108 can be adjusted in brightness within a finite number of brightness levels (e.g., 0 through 15) or have an infinite number of levels within a range. With a finite number of brightness levels (e.g., 16), the glasses can communicate using various brightness levels back to the camera and associated electronics. For example, the glasses may have a low battery, and the LEDs may indicate this by shining at level 15 (highest), then level 0 (off), then 8 (middle) in rapid succession. A video game console connected with the camera can decipher this code and display "Low Battery Warning" on the screen. This may avoid the need to have a low battery indicator on-board the glasses.

Figure 11B:
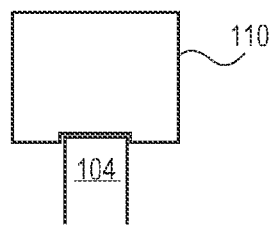
FIGS. 11B-11E illustrate alternate cross-sections of the 3-D glasses of FIG. 11A.

FIG. 11B illustrates cross section A-A for FIG. 11A. LGP 110 is one, integral translucent material, such as polymethyl methacrylate (PMMA) or other plastic suitable for a light guide. Other cross section geometries other than rectangular can be used, for example circular, oval, triangular, complex, etc.

Figure 11C:
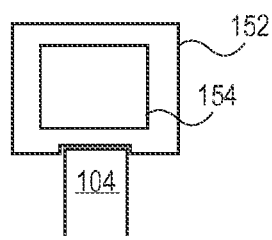

FIG. 11C illustrates an alternate cross section A-A for FIG. 11A. In this case, translucent/transparent material 152 surrounds core material 154, which can be other translucent/transparent material, foam, air, etc.

Figure 11D:
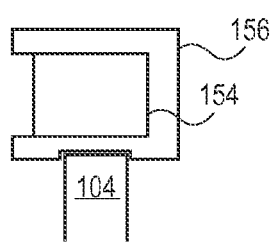

FIG. 11D illustrates an alternate cross section A-A for FIG. 11A. In this case, material 152 may be opaque and configured as a c-channel, with one side open. Translucent/transparent core material 154 resides in the c-channel.

Figure 11E:
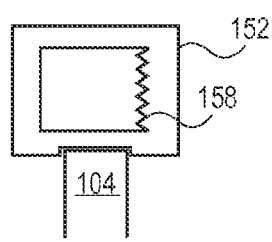

FIG. 11E illustrates an alternate cross section A-A for FIG. 11A. In this case, translucent/transparent material 152 has ridges 158 that can further disperse and reflect light conveyed through the frames. The ridges may be prisms as will be described later.

Figure 12:
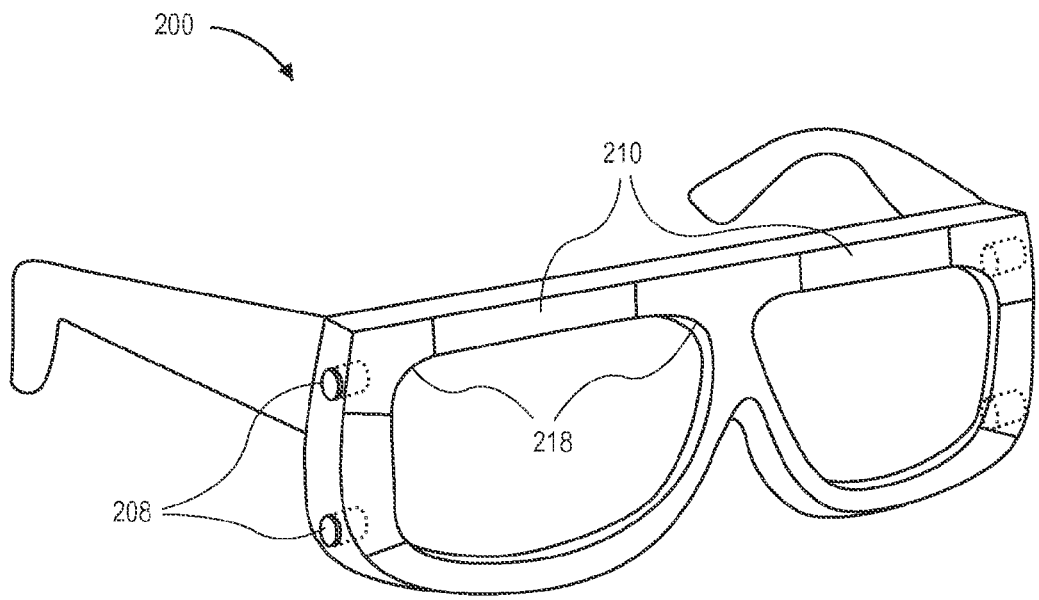
FIG. 12 illustrates 3-D glasses in accordance with an embodiment.
Figure 13:
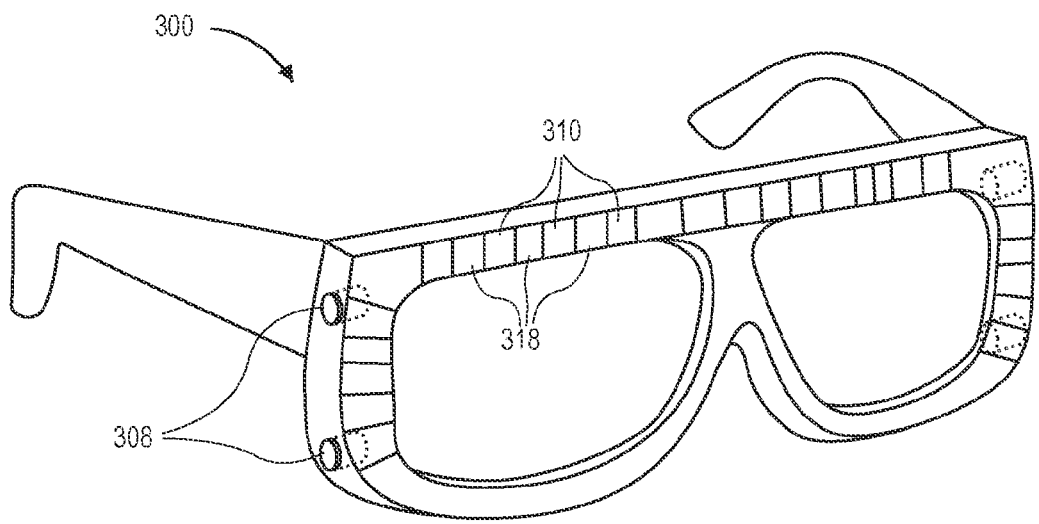
FIG. 13 illustrates 3-D glasses in accordance with an embodiment.

FIGS. 12 and 13 illustrate 3-D glasses according to an embodiment. In FIG. 12, LEDs 208 embedded in frame 200 illuminate LGP 210, which is partially covered by retroreflectors 218. Retroreflectors 218 are affixed in 5-millimeter (mm) wide strips over portions of LGP 210. The face of the retroreflectors reflects light, either ambient or from an illumination light, back toward the camera so that the camera can better track the glasses. A reflective backing on the rear of retroreflectors 218 helps bounce light escaping from LGP 210 back into LGP 210 so that causes more internal reflections within the LGP. More light stays in the LGP and is carried further through the frame. Other variations of patterns can be used depending on what patterns are easiest for a camera to track and depending upon the flexibility of shapes for the LGP. In the exemplary embodiment, LGP is relatively straight in the direction of LED illumination, but it is possible to curve the LGP more and convey light around the frame.

In FIG. 13, LEDs 308 embedded in frame 300 illuminate LGP 310. LGP 310 is partially covered by small sections of retroreflectors 318. The small sections of the retroreflectors have foil backings to reflect light back into the LGP. This configuration having smaller sections of retroreflectors may be better applied to situations in which a user is closer to a camera and the camera can therefore distinguish the retroreflectors from the LGP. In other situations, a first player can wear the glasses of FIG. 12, while second player can wear the glasses of FIG. 13. The camera can then distinguish between players one and two by recognizing the pattern of retroreflectors on the respective user's glasses.

In some embodiments, whole sections of LGP can be turned on or off. For example, the top horizontal bar of the frames can be on while the U sections that hold the lenses can be off. These sections can be optically isolated from one another, by metal foil or other opaque material, so that there is minimal bleed through from section to section.

Figure 14A:
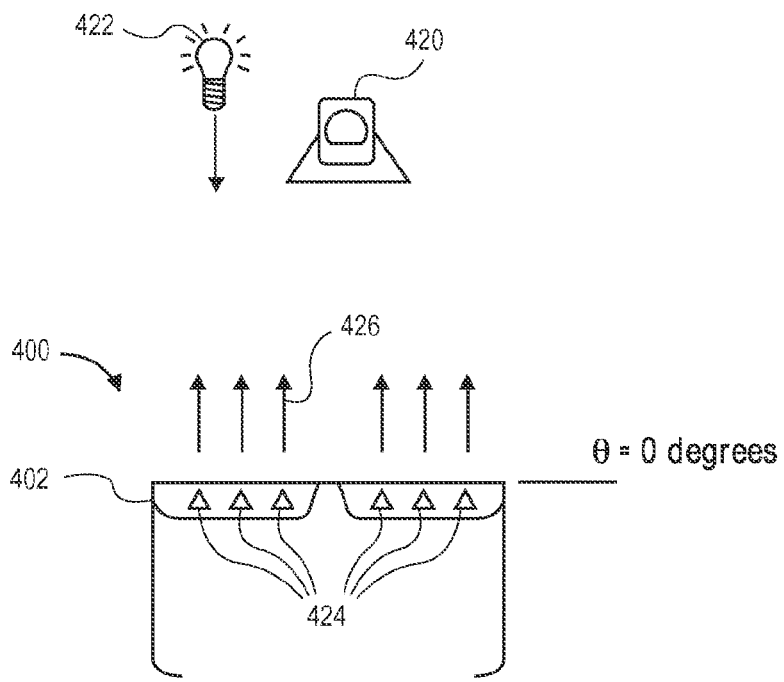
FIG. 14A illustrates 3-D glasses with prisms in accordance with an embodiment.
Figure 14B:
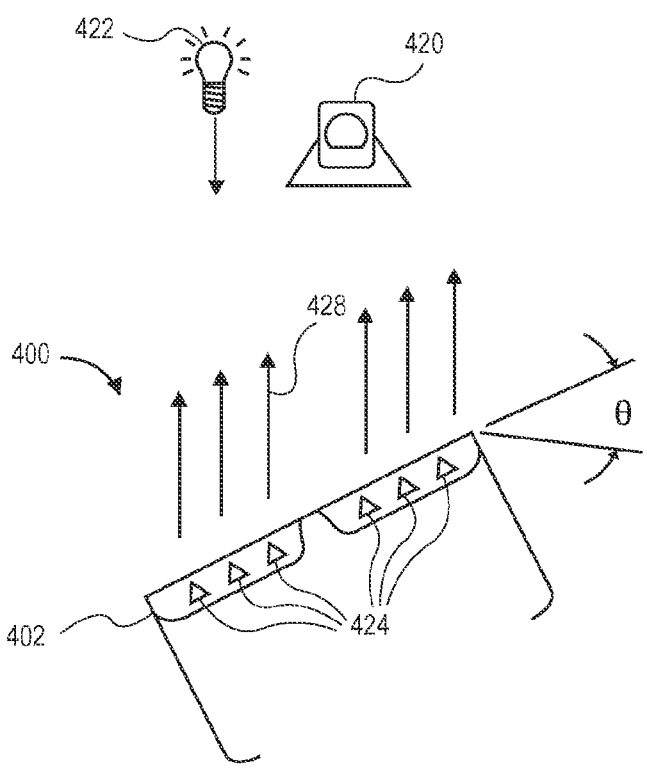
FIG. 14B illustrates the 3-D glasses of FIG. 14A rotated.

FIGS. 14A and 14B illustrate 3-D glasses with prisms in accordance with an embodiment.

In the figures, glasses 400 have mini prisms 424 in frames 402. The mini prisms are illuminated by white light 422, which can be ambient light or a light collocated with camera 420. Camera 420 is stationary.

In FIG. 14A, the glasses are in front of and at zero degrees of yaw to the camera. In this configuration, the white light from white light 422 is refracted and reflected at a predetermined wavelength 426. In FIG. 14B, the glasses are still in front of the camera, but they have been yawed at θ degrees to the camera. Because the mini prisms refract and reflect differently at this angle, the white light 422 is refracted and reflected at a different predetermined wavelength 428 back to the camera. The camera can distinguish between the wavelengths (i.e., colors) and based on a calibration table or other lookup table, determine the angle at which the glasses are oriented with respect to the camera.

Lenticular printing can be used instead of or in addition to mini prisms to refract and reflect light such that different colors are emitted at different angles. Plastics or other materials engineered with angular metamerism can also be used such that different angles produce different colors. Whether mini prisms, lenticular printing, angular metamerism, or other materials with similar properties are used, the color of light refracted and reflected from the materials can be calibrated with predetermined angles of pitch, yaw, and roll of the glasses.

Figure 15:
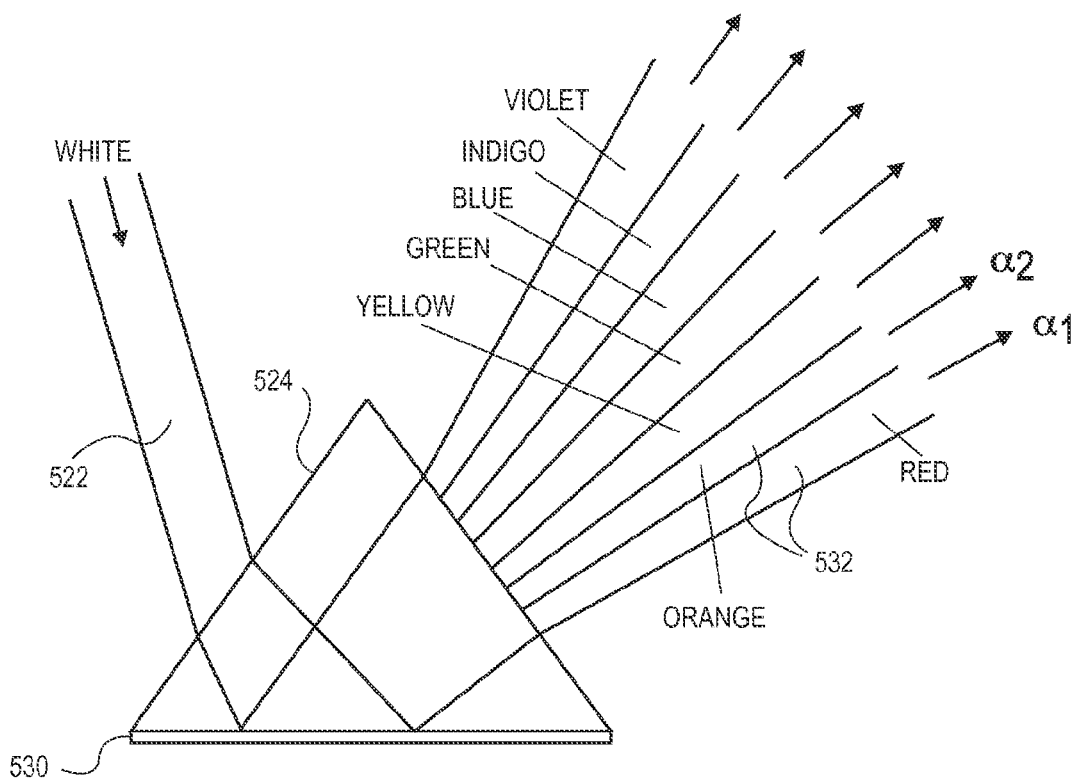
FIG. 15 illustrates a prism refracting and reflecting light in accordance with an embodiment.

FIG. 15 illustrates a single mini prism refracting and reflecting light. White light 522 enters prism 524 from the top right. Upon entry into the prism, the white light refracts and separates into colors, a phenomenon known as dispersion. The angle of separation of colors depends on the wavelength-dependent refractive index of the material out of which the prism is made. The beam reflects off of reflective portion 530 and back through the prism, until it exits prism 524 in its component colors 532.

The dispersion angle between two colors, for example red at angle $\alpha_1$ and orange at angle $\alpha_2$, is a function of the material used for the prism. The angles can be predetermined, calculated from the refractive index or empirically measured from the prism. For example, when the prism is angled between 30-40 degrees, red would be refracted and reflected out the front. Therefore, a camera seeing red can infer that the prism (and glasses to which the prism is affixed) is at an 30-40 degree angle from head on.

The difference between the angles, $\Delta\alpha = \alpha_1 - \alpha_2$, can be predetermined so that a rate of change can be determined. For example, $\Delta\alpha/\Delta t \approx \omega$ (angular velocity). For example, if the difference between angles for red and orange are 12 degrees, then a camera seeing red and then orange in 1 second can determine that the prism (and glasses to which the prism is affixed) is rotating at 12 degrees/second.

Figure 16:
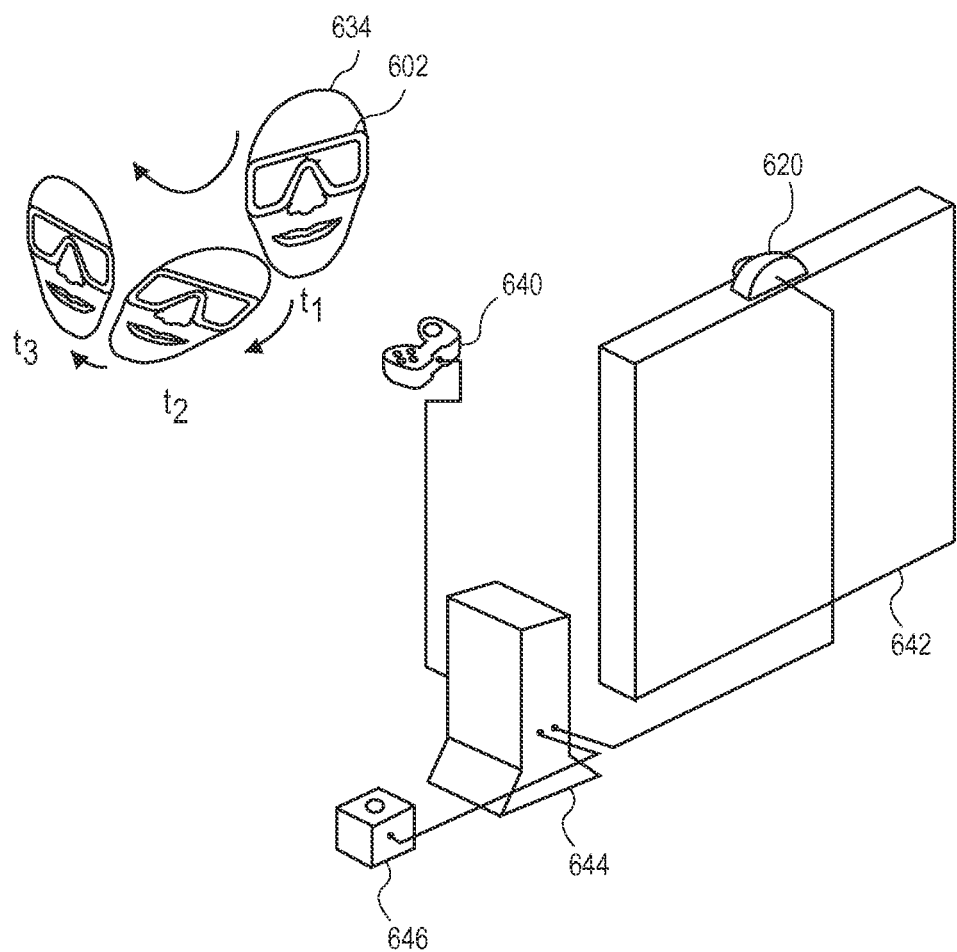
FIG. 16 illustrates head tracking for a video game console in accordance with an embodiment.

FIG. 16 illustrates head tracking for a video game according to an embodiment. Player's head 634 with glasses 602 is at one position and orientation at time $t_1$, another position and orientation at time $t_2$, and a further position and orientation at time $t_3$. Head 634 moves by swinging down and to the right during time period $t_1$ through $t_3$. The player can use conventional game controller 648 to play a video game and/or use only his or her body movements to control the game. Camera 620, seated in this embodiment on top of display 642, captures the user's position and movements and feeds them to game console 644. Tracking algorithms can be integral with camera 620 or be part of software or hardware in game console 644. In other embodiments, tracking logic can be in yet a separate device.

As the player swings his head and enjoys the game, camera 620 tracks player's head 634 using camera 620, which tracks illuminated glasses 602. In certain instances, however, ambient lighting may be of insufficient intensity for camera 620 to resolve glasses 602. For example, the player or his roommates may turn out the lights and draw curtains closed to make the game experience more encompassing. Upon the light conditions deteriorating, light sensor 646, which is distinct from game console 644 and camera 620, detects or otherwise measures a lack of ambient light and sends a signal to game console 644. Game console 644 compares the measured ambient light to a threshold value. The threshold value may be preset in the factory settings of the camera or console or be adjusted by the user. In its comparison, game console 644 determines that the ambient light level is beyond the threshold value. Game console 644 then sends a wireless signal to the glasses to adjust the lights embedded in the glasses. The tracked head movements can be used as inputs to the game, to render 3-D images, etc.

"Beyond a threshold value" includes a value that is farther than where the threshold value delineates, whether lower than or higher than the threshold value. For example, a value of 9 is not beyond a threshold value of 10 if the threshold value establishes a ceiling or maximum. However, a value of 11 is beyond the threshold value in this threshold ceiling situation. Conversely, a value of 11 is not beyond a threshold value of 10 if the threshold of 10 establishes a floor or minimum. A value of 9 would be beyond the threshold of 10 in this threshold floor situation.

Figure 17:
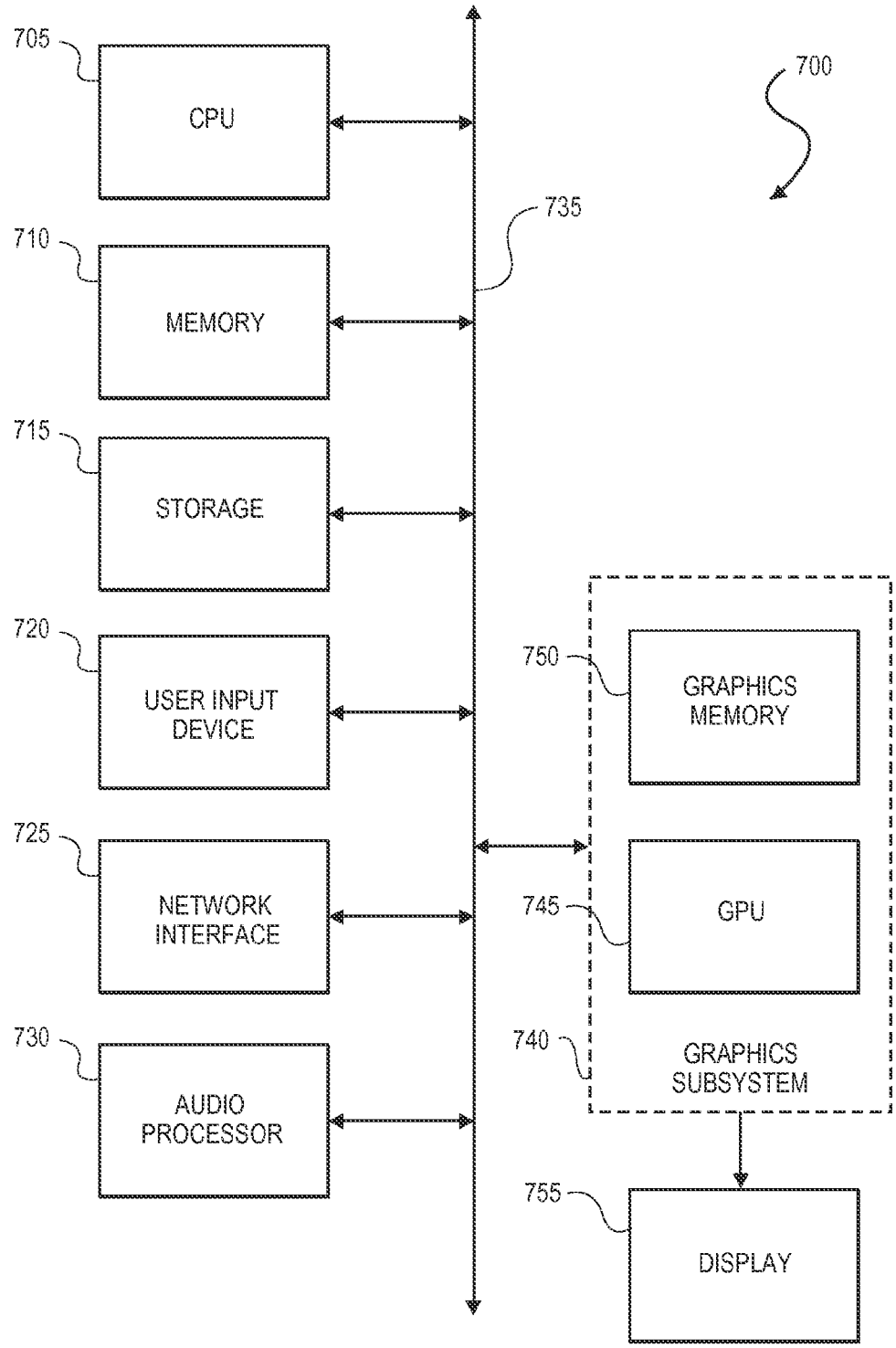
FIG. 17 is an example computer system suitable for use with embodiments of the invention.

FIG. 17 illustrates an example of a hardware system suitable for implementing a device in accordance with various embodiments. This block diagram illustrates a computer system 700, such as a personal computer, video game console and associated display, mobile device, personal digital assistant, or other digital device, suitable for practicing embodiments of the invention. Computer system 700 includes a central processing unit (CPU) 705 for running software applications and optionally an operating system. CPU 705 may be made up of one or more homogeneous or heterogeneous processing cores. Memory 710 stores applications and data for use by the CPU 705. Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 720 communicate user inputs from one or more users to the computer system 700, examples of which may include keyboards, mice, joysticks, touch pads, touch screens, still or video cameras, and/or microphones. Network interface 725 allows computer system 700 to communicate with other computer systems via an electronic communications network, and may include wired or wireless communication over local area networks and wide area networks such as the Internet. An audio processor 730 is adapted to generate analog or digital audio output from instructions and/or data provided by the CPU 705, memory 710, and/or storage 715. The components of computer system 700, including CPU 705, memory 710, data storage 715, user input devices 720, network interface 725, and audio processor 730 are connected via one or more data buses 735.

A graphics subsystem 740 is further connected with data bus 735 and the components of the computer system 700. The graphics subsystem 740 includes a graphics processing unit (GPU) 745 and graphics memory 750. Graphics memory 750 includes a display memory (e.g., a frame buffer) used for storing pixel data for each pixel of an output image. Graphics memory 750 can be integrated in the same device as GPU 745, connected as a separate device with GPU 745, and/or implemented within memory 710. Pixel data can be provided to graphics memory 750 directly from the CPU 705. Alternatively, CPU 705 provides the GPU 745 with data and/or instructions defining the desired output images, from which the GPU 745 generates the pixel data of one or more output images. The data and/or instructions defining the desired output images can be stored in memory 710 and/or graphics memory 750. In an embodiment, the GPU 745 includes 3D rendering capabilities for generating pixel data for output images from instructions and data defining the geometry, lighting, shading, texturing, motion, and/or camera parameters for a scene. The GPU 745 can further include one or more programmable execution units capable of executing shader programs.

The graphics subsystem 740 periodically outputs pixel data for an image from graphics memory 750 to be displayed on display device 755. Display device 755 can be any device capable of displaying visual information in response to a signal from the computer system 700, including CRT, LCD, plasma, and OLED displays. Computer system 700 can provide the display device 755 with an analog or digital signal.

In accordance with various embodiments, CPU 705 is one or more general-purpose microprocessors having one or more processing cores. Further embodiments can be implemented using one or more CPUs with microprocessor architectures specifically adapted for highly parallel and computationally intensive applications, such as media and interactive entertainment applications.

The components of the system can be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A marker device for enabling the tracking of an object by a camera, comprising:
   a first marker having means for changing color as it is rotated with respect to an observer, the first marker having a first means for refracting or reflecting a first predetermined color from a location on the marker when viewed from a corresponding first predetermined angle and refracting or reflecting a second predetermined color from the location on the marker when viewed from a corresponding second predetermined angle, the first and second predetermined colors being different from one another, wherein the means for refracting or reflecting includes a lenticular lens, a material having metamerism, or prisms;
   a second marker;
   means for supporting the first and second markers at a fixed distance from one another; and
   means for coupling the first and second markers to an object,
   whereby a distance to the object can be determined from an angular distance between the first and second markers and observed color of the first marker.

2. The device of claim 1 wherein the first marker has a second means for refracting or reflecting different predetermined colors over different angles, the second means having a finer range of color gradation than the first means.

3. The device of claim 1 wherein the first marker has a second means for refracting or reflecting different predetermined colors over different angles, the second means oriented perpendicularly to the first means.

4. The device of claim 3 wherein the first marker has a third means for refracting or reflecting different predetermined colors over different angles, the third means having a finer range of color gradation than the first means.

5. The device of claim 1 further comprising:
   a light,
   wherein the light is configured to illuminate through the first marker.

6. The device of claim 5 wherein the light shines through a backing of a lenticular lens.

7. The device of claim 1 wherein the object includes a user.

8. The device of claim 7 wherein the means for coupling the markers to the object includes glasses frames.

9. A system for tracking an object by a camera, comprising:
   a first marker having means for changing color as it is rotated with respect to an observer, the first marker having a first means for refracting or reflecting a first predetermined color from a location on the marker when viewed from a corresponding first predetermined angle and refracting or reflecting a second predetermined color from the location on the marker when viewed from a corresponding second predetermined angle, the first and second predetermined colors being different from one another, wherein the means for refracting or reflecting includes a lenticular lens, a material having metamerism, or prisms;
   a second marker, the second marker located at a fixed distance from the first marker;
   means for coupling the first and second markers to an object;
   a color camera;
   a circuit configured to use the camera to resolve an angular distance between the first and second markers and determine a distance to the first and second markers using the angular distance between the first and second markers and apparent color of the first marker.

10. The system of claim 9 wherein the means for coupling the markers to the object includes glasses frames.

11. A method for determining a distance to an object, comprising:
    receiving from a camera a color image of markers, the markers supported at a fixed distance from one another by an object;
    determining an angular distance between the markers;
    determining, using a processor operatively coupled to a memory, an orientation of the markers using an apparent color of at least one of the markers having means for changing color as the at least one of the markers is rotated with respect to an observer, the at least one of the markers having a first means for refracting or reflecting a first predetermined color from a location on the marker when viewed from a corresponding first predetermined angle and refracting or reflecting a second predetermined color from the location on the marker when viewed from a corresponding second predetermined angle, the first and second predetermined colors being different from one another, wherein the means for refracting or reflecting includes a lenticular lens, a material having metamerism, or prisms;

determining a distance from the camera to the markers using the angular distance and the determined orientation of the markers.

12. The method of claim 11 further comprising:

observing an apparent color of a coarse portion of one of the markers;

observing an apparent color of a fine portion of one of the markers;

determine the orientation of the markers based on the coarse and fine portions of the respective marker.

13. The method of claim 11 wherein the operations are performed in the order shown.

14. The method of claim 11 wherein each operation is performed by the processor operatively coupled to the memory.

15. The method of claim 11 further comprising:

determining an angular velocity from a rate of change of color images of the markers.

16. The device of claim 5 further comprising:

a light sensor, wherein the light is configured to adjust based on a signal from the light sensor.

* * * * *